(No Model.) 6 Sheets—Sheet 1.

A. B. FOWLER & G. E. WARREN.
HEEL FINISHING MACHINE.

No. 396,690. Patented Jan. 22, 1889.

Witnesses
Henry Chadbourn.
Henry S. Drake

Inventors
Alfred B. Fowler & George E. Warren
by Alban Andrén their atty.

(No Model.) 6 Sheets—Sheet 3.
A. B. FOWLER & G. E. WARREN.
HEEL FINISHING MACHINE.

No. 396,690. Patented Jan. 22, 1889.

Witnesses
Henry Chadbourn.
Henry S. Drake

Inventors
Alfred B. Fowler & George E. Warren
by Alban Andrew, their atty.

(No Model.) 6 Sheets—Sheet 4.

A. B. FOWLER & G. E. WARREN.
HEEL FINISHING MACHINE.

No. 396,690. Patented Jan. 22, 1889.

Witnesses
Henry Chadbourn.
Henry S. Drake

Inventors
Alfred B. Fowler & George E. Warren
by M. Van Sudren their atty (No Model.) 6 Sheets—Sheet 5.

A. B. FOWLER & G. E. WARREN.
HEEL FINISHING MACHINE.

No. 396,690. Patented Jan. 22, 1889.

Witnesses
Henry Chadbourn.
Henry S. Drake.

Inventors
Alfred B. Fowler & George E. Warren
by Alban Andrew their atty.

(No Model.) 6 Sheets—Sheet 6.
A. B. FOWLER & G. E. WARREN.
HEEL FINISHING MACHINE.
No. 396,690. Patented Jan. 22, 1889.
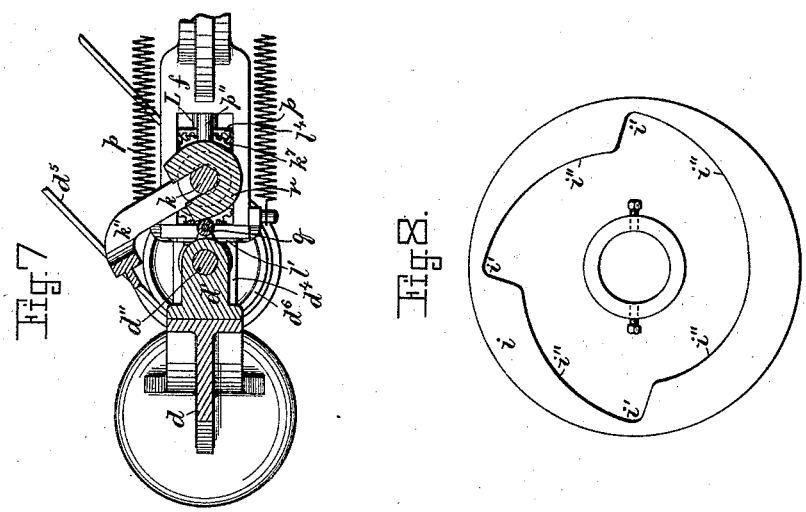
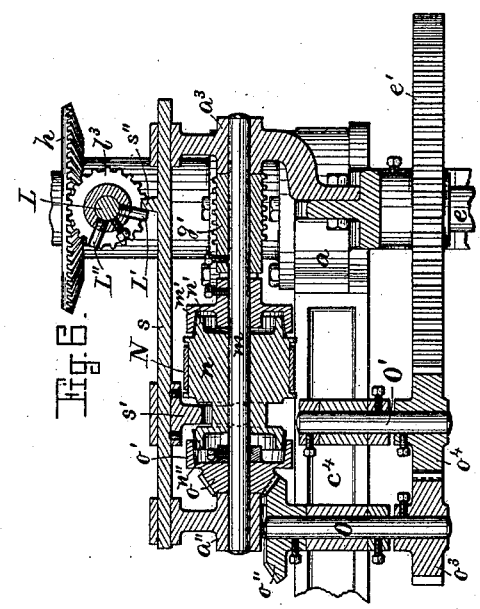

United States Patent Office.

ALFRED B. FOWLER AND GEORGE E. WARREN, OF EXETER, NEW HAMP-SHIRE, ASSIGNORS TO THE ROCKINGHAM MACHINE COMPANY, OF SAME PLACE.

HEEL-FINISHING MACHINE.

SPECIFICATION forming part of Letters Patent No. 396,690, dated January 22, 1889.

Application filed May 10, 1888. Serial No. 273,536. (No model.)

*To all whom it may concern:*

Be it known that we, ALFRED B. FOWLER and GEORGE E. WARREN, both citizens of the United States, and residents of Exeter, in the county of Rockingham and State of New Hampshire, have jointly invented new and useful Improvements in Heel-Finishing Machines, of which the following, taken in connection with the accompanying drawings, is a specification.

This invention relates to improvements in heel-finishing machines for boots or shoes; and it has for its object to automatically trim, rand, and scour, or to burnish, bead, and brush the heels of boots or shoes without removing them from the machine, as will hereinafter be more fully shown and described, reference being had to the accompanying drawings, wherein—

Figure 1:
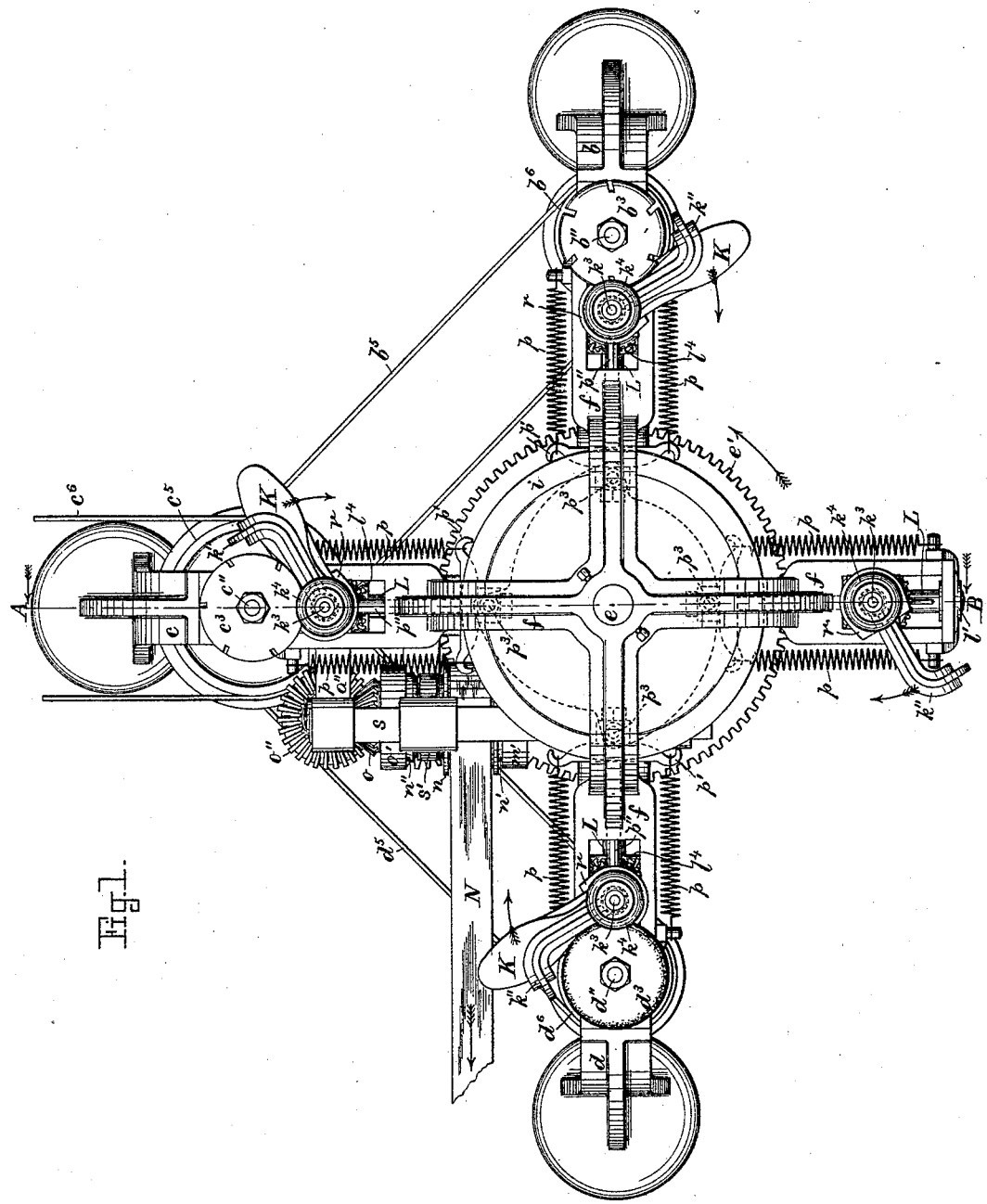
Figure 2:
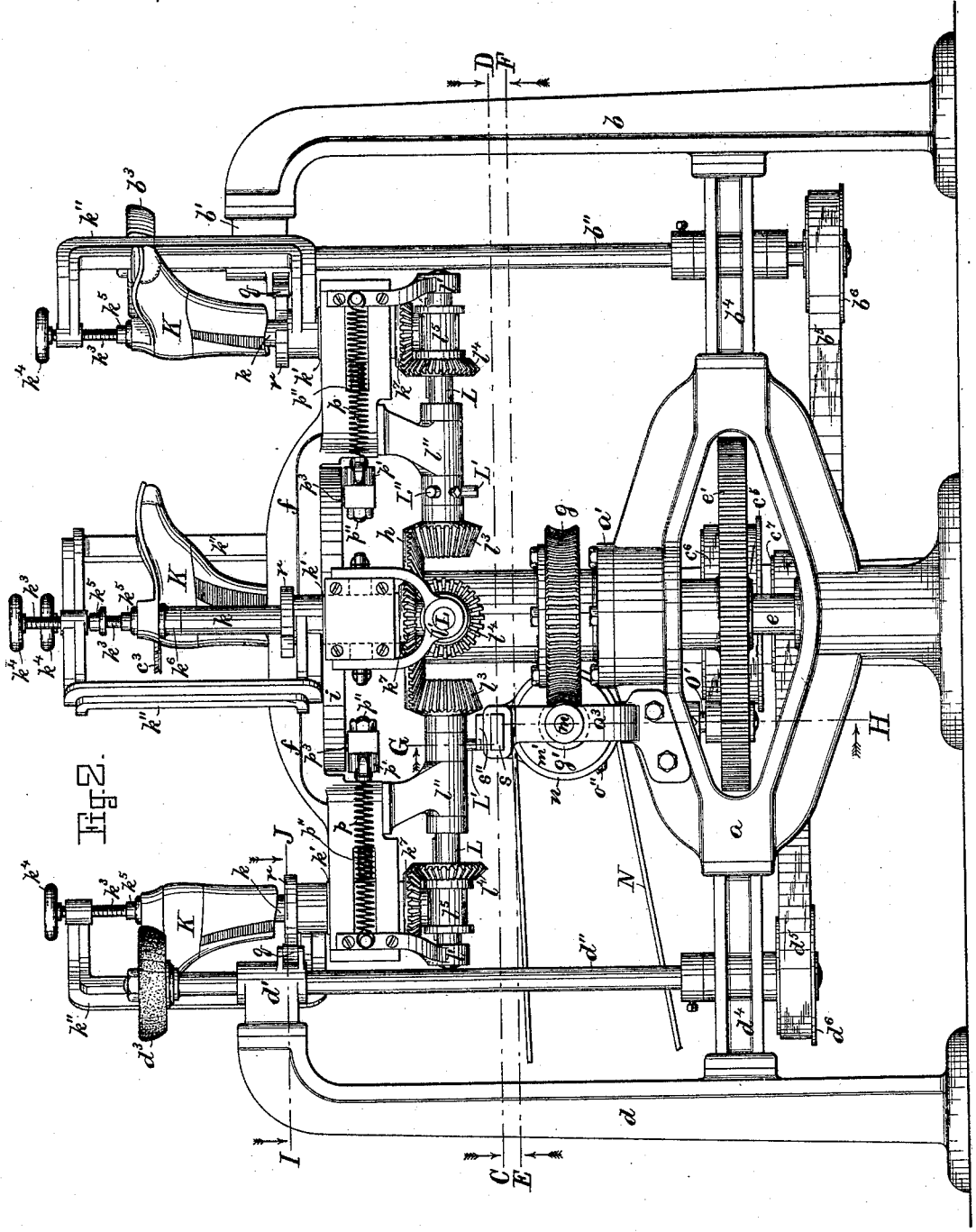
Figure 3:
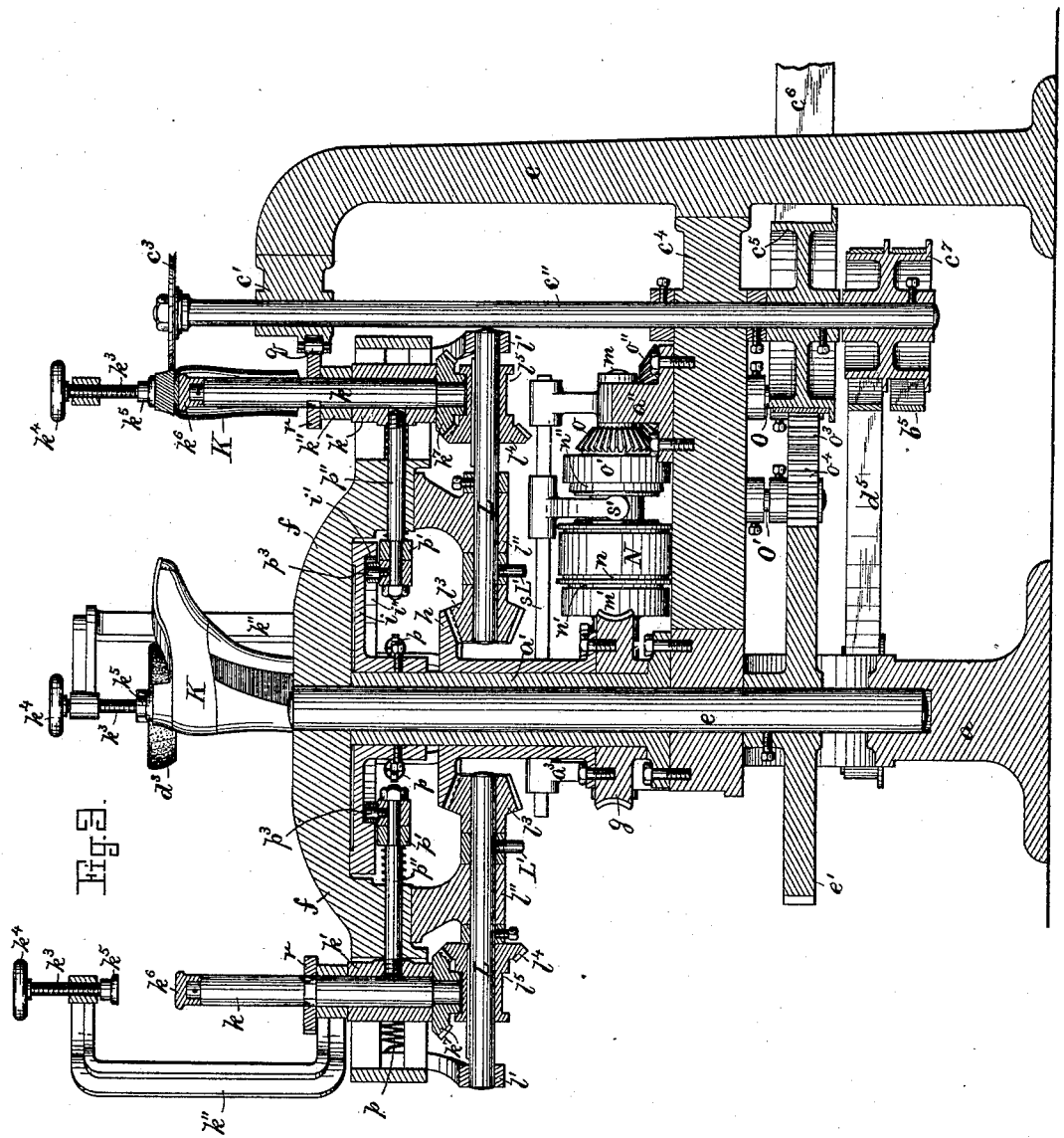
Figure 4:
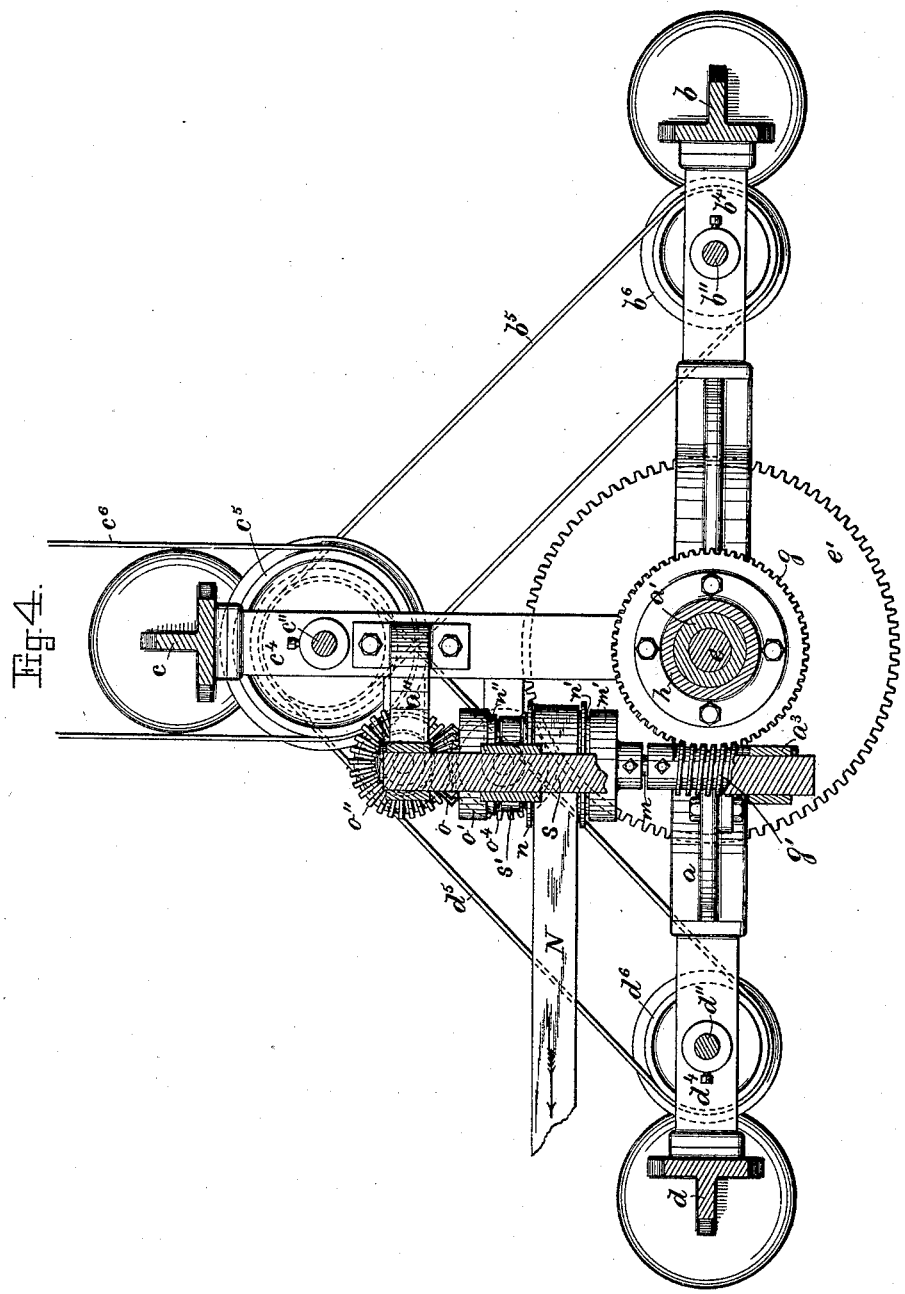
Figure 5:
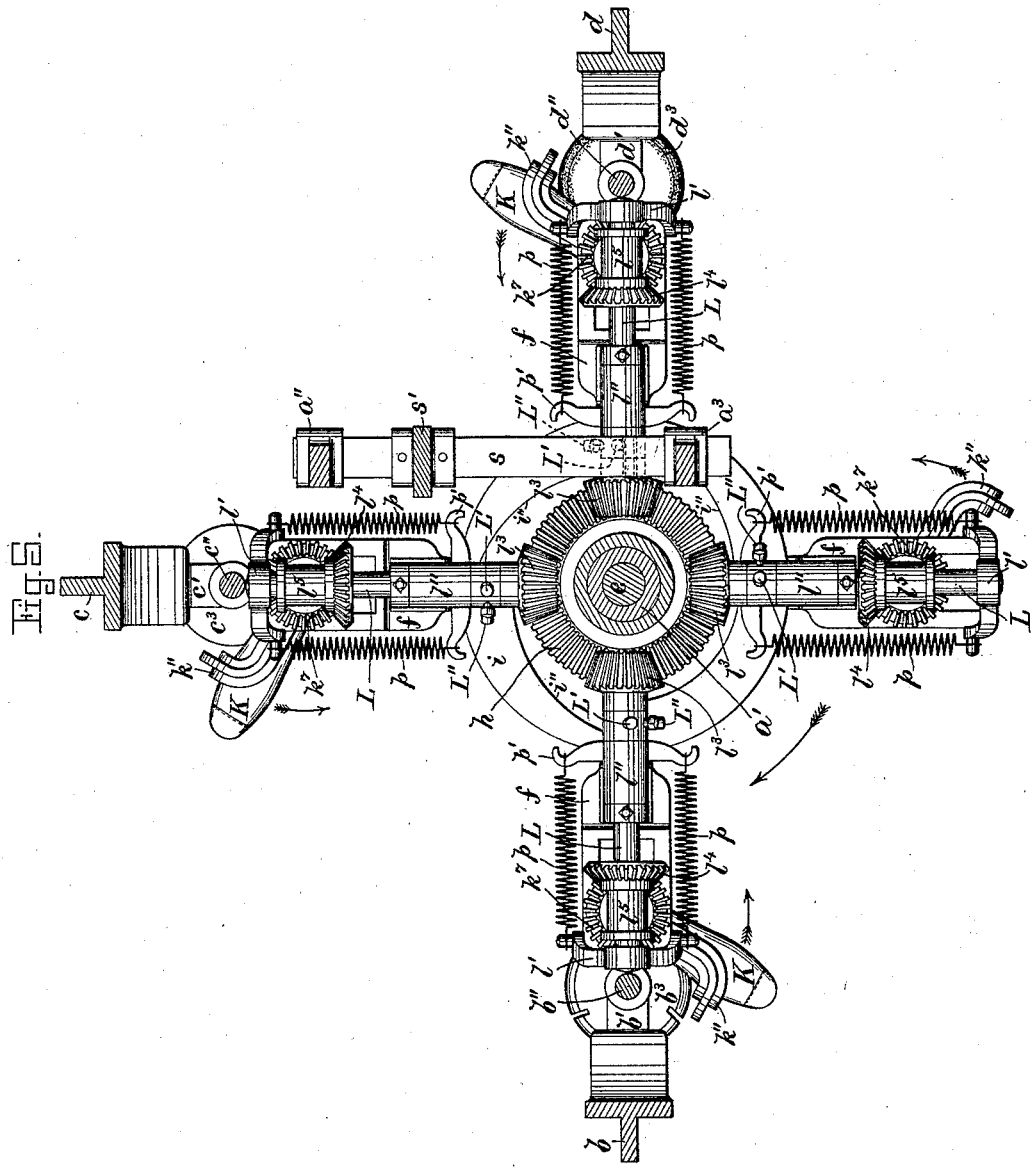

Figure 1 represents a plan view of the machine. Fig. 2 represents a front elevation of it. Fig. 3 represents a vertical section on the line A B shown in Fig. 1. Fig. 4 represents a cross-section on the line C D shown in Fig. 2. Fig. 5 represents a cross-section on the line E F shown in Fig. 2. Fig. 6 represents a vertical section on the line G H shown in Fig. 2. Fig. 7 represents a horizontal section on the line I J shown in Fig. 2, and Fig. 8 represents a detail view of the cam for moving the work-holders away from the rotary tools.

Similar letters refer to similar parts wherever they occur on the different parts of the drawings.

The machine has a group of rotary tools—for instance, a trimming, a randing, and a scouring tool—or, it may be used with a burnishing, a beading, and a brushing tool, to perform either of the two results—viz., to trim, rand and scour, or to burnish, bead, and brush a boot or shoe heel. In practice we prefer to use the improved machines in pairs and to trim, rand, and scour the boot or shoe heels on one machine, and to burnish, bead, and brush said heels on the second machine. This work on the boot or shoe heels is done automatically. The only thing required by the operator to do is to secure a boot or shoe to its holder or clamping device after another one has been finished on the machine, as will now be shown and described.

In the drawings, $a$ is the stationary frame or standard, and $b$, $c$, and $d$ are stationary posts having the respective bearings $b'$, $c'$, and $d'$ secured to their upper ends, in which bearings are journaled, respectively, the vertical shafts $b''$, $c''$, and $d''$, the latter having secured to their upper ends, respectively, the trimming, randing, and scouring tools $b^3$, $c^3$, and $d^3$. The stationary posts $b$, $c$, and $d$ are preferably connected to the stationary main frame $a$ by means of the horizontal beams or braces $b^4$, $c^4$, and $d^4$, which also serve as lower bearings for the rotary tool-shafts $b''$, $c''$, and $d''$.

A continuous rotary motion in the direction of arrows shown in Fig. 2 is imparted to said shafts $b''$, $c''$, and $d''$, as follows: To shaft $c''$ is secured a pulley, $c^5$, to which a rotary motion is conveyed by means of a belt, $c^6$, leading from a rotary driving-pulley on a counter-shaft, or in any other suitable or well-known manner. To the said shaft $c''$ is also secured the pulley $c^7$, from which straps $b^5$ and $d^5$ lead, respectively, to pulleys $b^6$ and $d^6$, secured to the shafts $b''$ and $d''$. In the frame or standard $a$ is journaled the vertical shaft $e$, having secured to it near its lower end the spur-gear $e'$, and having secured to its upper end the four-armed jack $f\,f\,f\,f$, as shown. To the frame $a$ is secured the upwardly-projecting vertical sleeve $a'$, that serves as an upper bearing for the jack-shaft $e$. The gear $e'$ and intermediate connecting driving mechanism, hereinafter to be more fully described, serves to impart an intermittent rotary motion to the four-armed jack $f\,f\,f\,f$ in the direction shown by arrow in Fig. 2. On the sleeve $a'$ is journaled the worm-wheel $g$, to which is secured in a suitable manner the bevel-gear $h$, by means of which and mechanism hereinafter to be described a rocking motion is imparted to the work-holding devices. Near the upper end of the sleeve $a'$ is secured to it the face-cam $i$, the object of which is to cause the work-holders to be automatically drawn inward and away from the rotary tools $b^3$ $c^3$ $d^3$ during the intermittent rotary motion of the four-armed jack $f f f f$, as will hereinafter be more fully described.

The work-holders for holding the boots or shoes, of which there are as many as there are arms on the intermittently-rotating jack $f$, are constructed as follows: Each one consists of a spindle, $k$, the lower end of which is journaled in the radially-movable block $k'$, that is guided in the outer forked end of each of the jack-arms $f$, as shown, each of said spindles $k$ having secured to it directly above the block $k'$ the bent arm $k''$, through the upper end of which is screwed the clamping-screw $k^3$, having hand-wheel $k^4$ in its upper end and pressure-block or washer $k^5$ in its lower end, as shown in Fig. 3, between which and a rest or washer, $k^6$, on the upper end of the spindle $k$, the boot or shoe K is clamped during the operation of finishing its heel. Each spindle $k$ has secured to its lower end, below its block $k'$, the small bevel-gear $k^7$, by which and connecting mechanism to the bevel-gear $h$ a forward and back rotary motion is automatically imparted to the spindle $k$.

In bearings $l'$ $l''$, attached to the under side of each of the jack-arms $f$, are journaled the shafts L L L L, one for each jack-arm, as shown in Figs. 2, 3, and 5. To the inner ends of said shafts L are secured the bevel-pinions $l^3$, the teeth of which mesh in the teeth of the bevel-gear $h$, that is secured to the worm-wheel $g$, as shown in Fig. 3. Between the bearings $l'$ and $l''$, on each of the shafts L, is splined the bevel-pinion $l^4$, the teeth of which mesh in the teeth of the bevel-pinion $k^7$ on the work-holder spindle $k$, as shown in Fig. 3. The pinions $k^7$ and $l^4$ are of equal size, as shown, and the hub of the latter is provided with an external annular groove, $l^5$, adapted to receive the downwardly-projecting hub of the pinion $k^7$, as shown in Fig. 3, by which arrangement the said pinions are held in gear with each other during the radial adjustment of the work-holder-carrying blocks $k'$ $k'$ $k'$ $k'$, as will be hereinafter described. The gear $h$ is of such a size relative to the pinions $l^3$ $l^3$ that one-fourth of a revolution of the said gear $h$ will cause the work-holding spindles $k$ $k$ to revolve two-thirds of a revolution, or as much as is necessary to bring the curved portion of the boot or shoe heel (from breast to breast) in contact with the respective rotary tools $b^3$, $c^3$, and $d^3$.

The mechanism for turning the spindles $k$ $k$ around their respective axis, so as to bring the curved heel portions in contact with the rotary tools, is constructed and arranged as follows: In stationary bearings $a''$ $a^3$, secured to the frame $a$ or other stationary part of the machine, is journaled the shaft $m$, on which is loosely supported the pulley $n$, to which a continuous rotary motion is imparted by means of a belt, N, leading from a rotary driving-pulley suitably located in proximity to the machine. The pulley $n$ has in one end a tapering friction-clutch ring, $n'$, which when held by means of the automatic shipper device (hereinafter to be described) infrictional contact with the friction-clutch $m'$, as shown in Fig. 6, imparts a rotary motion to said friction-clutch that is secured to the shaft $m$, and consequently causes the latter to be rotated in one direction as long as the clutch $m'$ is held in frictional contact with the pulley $n$. To the shaft $m$ is also secured the worm $g'$ that intermeshes with the teeth on the worm-wheel $g$, as shown in Fig. 4. The worm-wheel $g$ being secured to the bevel-gear $h$, as hereinabove described, and the latter geared to the spindles $k$ $k$ $k$ $k$ by means of pinions $l^3$ $l^4$ $k^7$ and shafts L, it will be seen that the desired rotary motions are imparted to the spindles $k$ from the pulley $n$ in one direction—the one shown by arrows on the shoes K in Fig. 1—as long as the pulley $n$ and clutch $m'$ are held in frictional contact, as shown in Fig. 6.

The mechanism for intermittently rotating the jack-arms $f f f f$, in the direction of arrow shown in Fig. 1 is constructed as follows: On the shaft $m$ is loosely journaled the bevel-pinion $o$, provided with a friction-clutch, $o'$, as shown in Fig. 6. The rotary pulley $n$ has a tapering friction-ring $n''$, as shown in said Fig. 6, and when the said pulley $n$ is moved by the automatic shipper device on the shaft $m$ sufficiently to frictionally connect the parts $n''$ $o'$ it will be seen that a rotary motion is imparted to said pinion $o$ from said pulley $n$ at the same time as the parts $n'$ $m'$ are disconnected from each other, and consequently the worm $g'$ remains stationary when the pinion $o$ is rotated, and vice versa. The pinion $o$ is geared to the bevel-pinion $o''$ that is secured to the shaft O, the latter having secured to it also a pinion, $o^3$, that gears or meshes into the teeth of the intermediate gear, $o^4$, secured to the shaft O', and the latter gear $o^4$ meshes in the teeth of the gear $e'$ that is secured to the jack spindle or shaft $e$, as shown in Figs. 3 and 6. The shafts O and O' are journaled in suitable bearings secured to the stationary frame of the machine. By this mechanism the jack-arms $f$ are intermittently rotated one-fourth of a revolution, so as to bring the shoes successively from the place marked B in Fig. 1, where the operator stands, to be acted on in turns by the respective rotary trimming, randing, and scouring tools $b^3$, $c^3$, and $d^3$, and back again to the place marked B, where the operator removes the finished shoe and replaces it with another one, to be treated in turn by the respective tools $b^3$ $c^3$ $d^3$, and so on.

During the intermittent rotary motion of the jack-arms $f$ it is essential that the heels of the boots or shoes should be withdrawn from the rotary tools, so as to be properly presented for the action of the next tool in succession, and for this purpose we make use of an automatic shoe-holder-releasing mechanism, constructed as follows: The spindles $k$ and their radially-movable blocks or carriers $k'$ are normally held in their outer working positions (shown in Fig. 1) each by the influence of springs $p\,p$, the outer ends of which are secured in a suitable manner to the jack-arms $f$, and having their inner ends secured to a cross bar or arm, $p'$, on the spindle $p''$, that passes through a radial perforation in the lower portion of the jack-arm, in which it can move forward and back. The spindle $p''$ is secured at its outer end in a suitable manner to the block $k'$, as shown in Fig. 3. Each spindle $p''$ has in its inner end a vertical pin, or pin and roll, $p^3$, which, when the jack-arms $f$ are at rest, is forced outward by the influence of the springs $p\,p$ into one of the notches $i'\,i'\,i'$ on the under side of the stationary cam-disk $i$. (Shown in Figs. 3 and 8.) The disk $i$ has internal cam-surfaces, $i''\,i''\,i''$, curved or gradually tapering from one notch to the other, as shown in said Fig. 8, which cause the blocks $k'$, their spindles $k$, and the shoes held thereon, to be moved toward the axis of the shaft $e$ as soon as the jack-arms commence to rotate by the pin and rolls $p^3$ riding on or against the cam-surfaces $i''$ until said jack-arms reach the limit of the intermittent rotary motion, when the springs $p\,p$ cause the pin and rolls $p^3$ to be moved outward into the notches $i'\,i'\,i'$ in the cam-disk $i$, and consequently also cause the work-carrying spindles $k$ to be moved outward to their normal working positions (shown in Fig. 1) by the influence of the said springs $p\,p$. The only exception to this is the work-holder carried to the position marked B in Fig. 1, where the operator stands, which is preferably held in its inward position by the influence of the elongated cam-surface at this place. There being no rotary tool at such place B, where the operator stands, it is therefore not essential to move the work-carrier outward until it reaches the first rotary tool, $b^3$, in the series of tools. Each tool-bearing $b'\,c'\,d'$ is provided on its inside with an anti-friction roller, $g$, (shown in Figs. 2, 3, and 7,) preferably laterally adjustable, that serves to limit the outward motion of the spindles $k$, each of which has attached to it, in a suitable manner, a heel guide or former, $r$, of the shape desired to be imparted to the heel, and said heel-guide is held by the influence of the springs $p\,p$ against the roller $g$ during the partial rotation of the spindle $k$ and the shoe secured to it, thus guiding and presenting the boot or shoe heel properly to the action of the rotary tools.

During the intermittent rotary motion of the shaft $e$ and the jack-arms $f$ the gear $h$ is held stationary on account of the worm and worm-gear $g'\,g$ remaining still during such motion of the jack-arms, as before stated; but as the gear $h$ at all times meshes in the teeth of the pinions $l^3$ that give rotary motion to the work-holding spindles $k$, it will be seen that by the rotation of the jack-arms around the now stationary gear $h$ a reverse rotary motion is imparted to each of the spindles $k$ equal to their original rotation while being acted on by the rotary tools, thus presenting the boot or shoe heel equally to the action of the successive rotary tools.

The automatic shipper device for conveying intermittent rotary motion, respectively, to the worm-wheel $g$, the gear $h$, and its connecting mechanism, and to the shaft $e$, the gear $e'$, and the jack-arms $f$, is constructed as follows: Above the shaft $m$, Fig. 6, is located in suitable guides the movable shipper-bar $s$, having secured to it the forked arm or lever $s'$, fitting into an annular groove on the pulley, $n$, by which a longitudinal motion is imparted to said pulley and its friction rings or surfaces $n'\,n''$ as the said shipper-bar $s$ is moved forward and back. To the top of the said shipper-bar $s$ is secured, or made in one piece, the tooth or projection $s''$, which is actuated by teeth or projections $L'\,L''$, secured to each of the shafts $L\,L\,L$, as shown in Figs. 2, 3, 5, and 6, during the oscillating motion of that one of said shafts $L$ which for the time being is directly above the tooth $s''$ on said shipper-bar $s$.

The operation of the improved machine is as follows: The machine is set in operation by means of belt-power applied to the pulleys $c^5$ and $n$, as above mentioned. The position of the operator is at or near the place marked B in Fig. 1, where he in turn removes the finished shoe from the holding device on the jack-arm nearest to him and secures to such holding device a boot or shoe the heel of which is to be finished. The jack-arm to which the shoe is secured is automatically swung one-fourth of a revolution until it comes opposite to the trimmer or burnishing tool $b^3$, when the jack remains stationary long enough to enable the shoe to be turned around sufficiently to enable the tool $b^3$ to reach its curved heel surface from breast to breast, after which the jack again commences to rotate one-fourth of a revolution until the boot or shoe comes opposite to the randing or beading tool $c^3$, and during such quarterly revolution of the jack the boot or shoe is swung automatically backward, so as to present the same point of its heel portion to the action of this second rotary tool as was first presented to the first tool. The jack remains stationary in this latter position sufficiently long to enable the shoe to be turned around enough for permitting the randing or beading tool $c^3$ to reach the whole of its curved portion from breast to breast. The jack is now again swung automatically one-fourth of a revolution until it comes opposite to the scouring or brushing tool $d^3$, where a similar operation takes place, and so on until the shoe originally put on at B, Fig. 1, returns to such place, where it is removed and replaced by another one, to be acted on in the same manner, and so on.

What we wish to secure by Letters Patent, and claim, is—

1. The combination of an intermittently-rotating jack, a series of rotary tools located around the jack outside thereof, a series of radially-movable blocks carried by the jack, a series of circularly-oscillating work-holders on the radially-movable blocks, and means for rotating the tools, intermittently rotating the jack, oscillating the work-holders, and automatically moving the blocks and work-holders radially inward while the jack is rotating and outward when the jack ceases to rotate, substantially as described.

2. The combination of an intermittently-rotating jack, a series of rotary tools around the jack outside thereof, a series of radially-moving blocks mounted on the jack, a series of circularly-oscillating work-holders carried by the radially-moving blocks, means for rotating the tools, intermittently rotating the jack and oscillating the work-holders, and a face-cam for moving said blocks radially inwardly while the jack is rotating and permitting their outward radial movement when the jack ceases to rotate, substantially as described.

3. In a heel-finishing machine, the mechanism for automatically moving the work-holders to and from the rotary tools, consisting of the intermittently-rotary jack $f$ $f$, having blocks $k'$, arranged to slide out and in on said jack, and having spring-pressed spindles $p''$ secured to them, combined with the stationary cam $i$ and pins, or pins and rolls $p^3$, mounted on said spindles $p''$, substantially as and for the purpose set forth.

4. In a heel-finishing machine, the mechanism for automatically oscillating the work-holders, consisting of the intermittently-rotating gear $h$, the shafts L L, having pinions $l^3$ secured to their inner ends and geared to the said gear $h$, and having longitudinally-adjustable pinions $l^4$, geared to pinions $k^7$, secured to the work-holding spindles $k$, substantially as and for the purpose set forth.

5. In a heel-finishing machine, the intermittently-rotating jack $f$ $f$, having mounted in its slotted arms the radially-movable and oscillating work-holding spindles $k$ $k$, in combination with the intermittently-rotating gear $h$, positively geared, as described, to said spindles $k$, and the stationary cam $i$, substantially as and for the purpose set forth.

6. In a heel-finishing machine, the intermittently-rotating jack $f$ and its radially-adjustable work-holding spindles $k$, and automatic mechanism for oscillating said spindles, combined with the heel-formers $r$, secured to said spindles, and rollers or projections $g$, arranged relative to the rotary tools of the machine, substantially as and for the purpose set forth.

7. In a heel-finishing machine, the mechanism for automatically imparting an intermittent rotary motion to the jack $f$ $f$ and to the gear $h$, consisting of the rotary pulley $n$, the friction-clutch $m'$, secured to shaft $m$, the worm $g'$, also secured to the latter, and worm-wheel $g$, secured to the gear $h$, and clutch-gear $o$, loosely journaled on said shaft $m$ and geared in a suitable manner to the gear-wheel $e'$ on the jack-shaft $e$, substantially as and for the purpose set forth.

8. In a heel-finishing machine, the intermittently-rotating gear $h$, the shafts L and their pinions $l^3$, geared to said gear $h$, for the purpose of imparting an oscillating motion to the work-holders, as described, combined with the shipper-lever $s$, having tooth or projection $s''$, and pins or projections L' L'', secured to the shafts L, for automatically reversing the movement of said shipper-bar, substantially as and for the purpose set forth.

9. The combination of an intermittently-rotating jack, a series of rotating tools arranged around the jack and outside thereof, a series of radially-moving blocks on the jack, a series of circularly-oscillating work-holders carried by the blocks, means for intermittently rotating the jack, rotating the tools, and oscillating the tools, a cam acting to move the blocks and work-holders radially inward while the jack is rotating, and springs to move the blocks and work-holders radially outward when the jack ceases to rotate, substantially as described.

In testimony whereof we have signed our names to this specification, in the presence of two subscribing witnesses, on this 5th day of March, A. D. 1888.

ALFRED B. FOWLER.
    GEO. E. WARREN.

Witnesses:
 D. G. JACKSON,
 H. H. TAYLOR.